(No Model.)
G. H. COURSEN.
ROTARY RAZOR STROP.
No. 458,521. Patented Aug. 25, 1891.
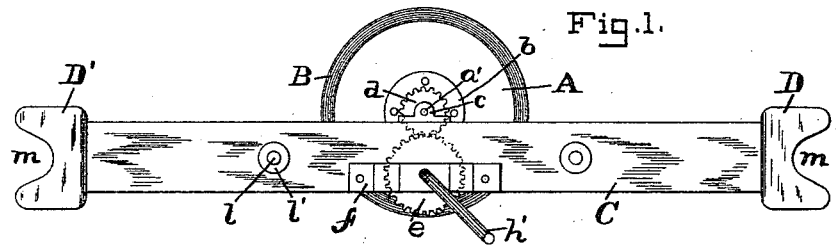
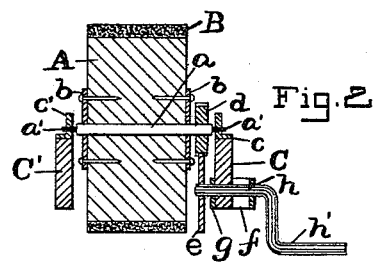
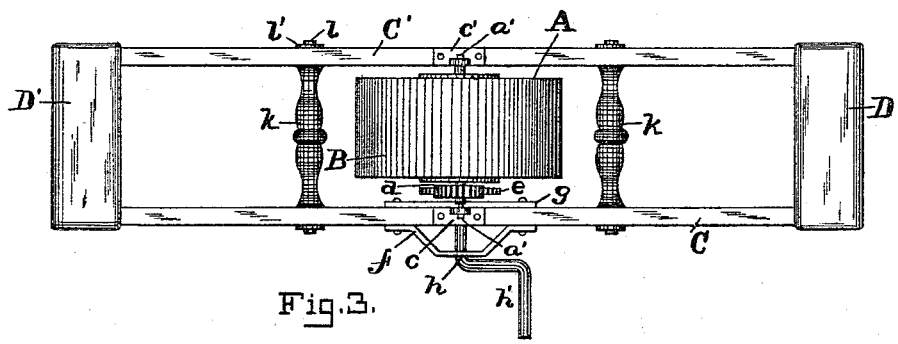
WITNESSES:
Otto H. Ehlers.
F. P. Davis.
INVENTOR:
George H. Coursen,
BY Chas. B. Mann
ATTORNEY.

UNITED STATES PATENT OFFICE.

GEORGE H. COURSEN, OF BALTIMORE COUNTY, MARYLAND.

ROTARY RAZOR-STROP.

SPECIFICATION forming part of Letters Patent No. 458,521, dated August 25, 1891.

Application filed April 4, 1891. Serial No. 387,619. (No model.)

*To all whom it may concern:*

Be it known that I, GEORGE H. COURSEN, a citizen of the United States, residing in Baltimore County, in the State of Maryland, have invented certain new and useful Improvements in Rotary Razor-Strops, of which the following is a specification.

This invention relates to an improvement in rotary razor-strops, the object being to provide a device which can be employed without the necessity of clamping or otherwise attaching it to any object, and which can be readily and conveniently used by any one under any circumstances to produce a sharp and keen edge on a razor.

With this end in view the invention consists in the novel features of construction and combinations of parts hereinafter described, and pointed out in the claims.

In the accompanying drawings, illustrating the invention, Figure 1 is a side elevation of the device; Fig. 2, a cross-section through the center, and Fig. 3 a top or plan view.

In carrying out my invention I employ a rectangular frame which comprises two parallel side bars C C' and a pair of end cross pieces or blocks D D', each of which has in its outermost face a groove $m$, extending crosswise of the frame and of such a depth that the block appears as a pair of jaws, as seen in Fig. 1. The purpose of this construction will be explained hereinafter.

At or about the middle of the frame, between the side bars C C', is permanently located a roller A, which has an exterior surface B, preferably of leather. The axle $a$ of this roller extends through plates $b$, secured on the opposite sides of the roller, and the projecting ends $a'$ of the axle are journaled in bearings $c\ c'$, secured on the upper edges of the side bars C C', respectively. On the axle $a$, inside the bearing $c$, is rigidly mounted a small gear-wheel $d$, which is engaged by a larger gear-wheel $e$, located inside the frame and mounted on the end of a crank-shaft $h$, which extends through the side bar C of the frame and whose bearings are formed by a plate $g$ on the inside of said side bar and a plate $f$ on the outside in form of a bracket projecting out from the side bar, the said two plates being secured together through the side bar. The crank-shaft $h$ has a crank $h'$ on its end, by means of which it is turned, and motion is imparted to the roller A through the gear above described. The frame is strengthened and rendered more stable by a pair of intermediate cross-pieces $k\ k'$, connecting the side bars C C', one being on each side of the roller A. These cross-pieces are secured to the frame by rivets $l$, extending through them and clinched over washers $l'$ on the exterior of the side bars.

The manner of using the strop is as follows: The operator causes one grooved end piece or block D to take over the edge of some piece of furniture—such as a dressing-stand, table, or shelf—(or this block may be simply placed against some flat surface) and presses with his breast against the opposite cross piece or block D' to hold the frame securely. With one hand he turns the crank $h'$ to revolve the roller A, and with the other hand he applies the razor to the surface B of said roller. In this manner the desired result may be obtained and an exceedingly-sharp edge put on the razor.

It will be observed that one of the end blocks of the frame constitutes a breast-piece, while the opposite one is a presser-block to take against some stationary object. This device may be reversed end for end, as circumstances require, and used as readily one way as the other, thus adapting it for the use of both right and left handed persons.

It will be seen that this strop can be used anywhere by simply pressing the frame between some stationary object and the breast to hold it and then turning the roller. No adjustment of the device is necessary and no means for attaching it to some object are requisite, such as a clamp or the like; but the article is complete in itself and ready for use.

It is evident that my device might be varied in many particulars, and hence I do not limit myself to the exact construction shown, but consider myself entitled to all such variations as come within the spirit and scope of the invention.

What I claim as new, and desire to secure by Letters Patent, is—

1. A razor-strop comprising a frame having side bars and at each end a cross-piece provided with a groove, and a roller mounted between the side bars and provided with a suitable crank for turning it.

2. A razor-strop comprising a roller provided with a suitable crank for turning it, and an elongated support for said roller, having at the middle part thereof bearings for the same, and provided with a cross-piece or block at each end having in its outermost face a groove extending crosswise of the frame and entirely across the block, either of which end pieces may in the use of the strop constitute a breast-piece, while the other constitutes a presser-block to take against some stationary object.

In testimony whereof I affix my signature in the presence of two witnesses.

GEORGE H. COURSEN.

Witnesses:
FELIX R. SULLIVAN,
H. HALSEY STRYKER.